Figure 1:
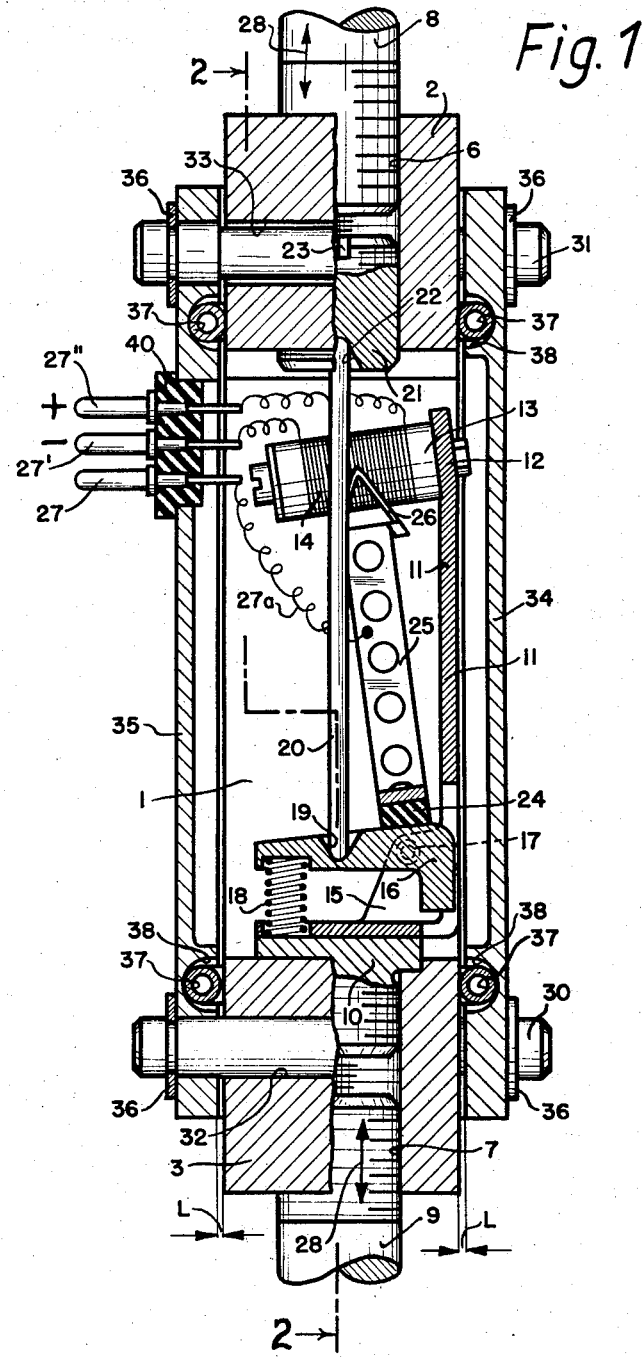

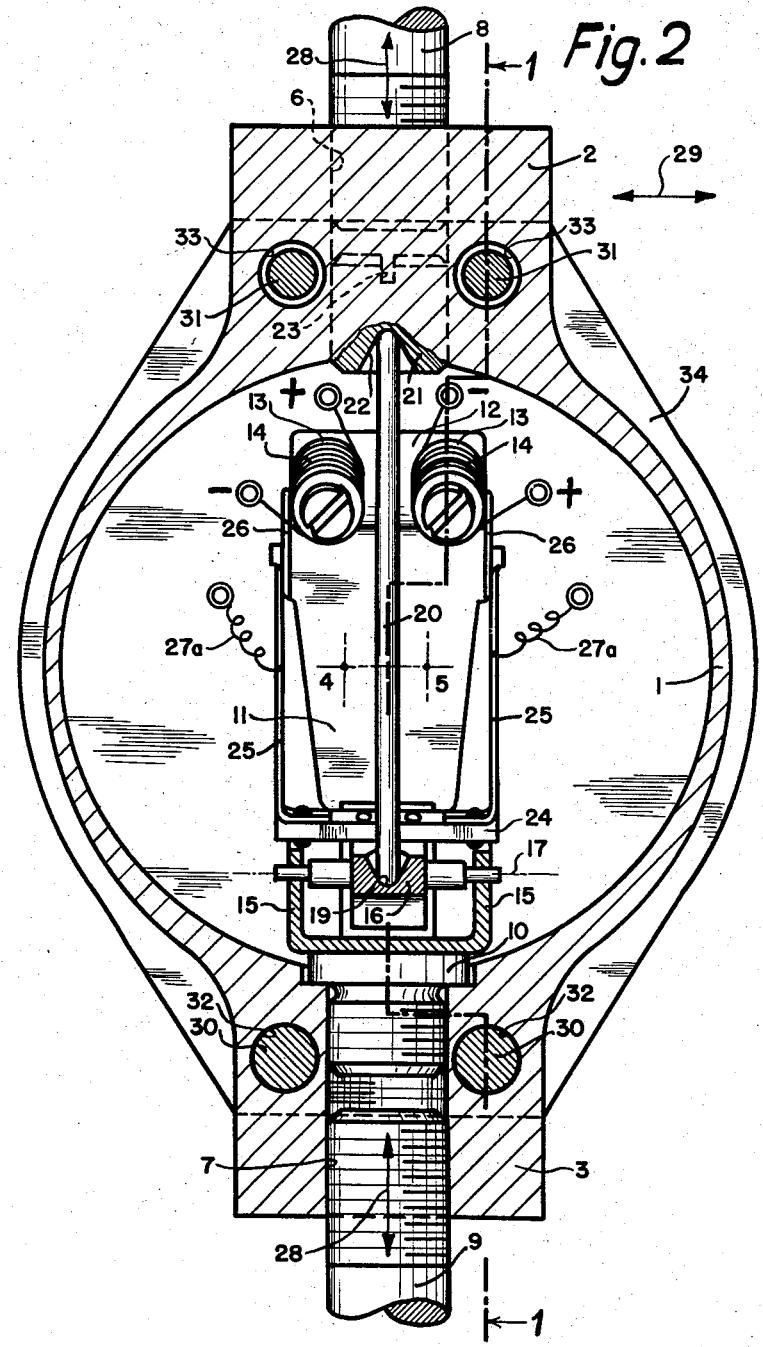

United States Patent Office 2,877,646
Patented Mar. 17, 1959

2,877,646

DYNAMOMETER

Hans Jurgen Dudenhausen, Stuttgart, Germany, assignor to Intavex, Inc., New York, N. Y., a corporation of New York Application April 4, 1956, Serial No. 576,197

5 Claims. (Cl. 73—141)

Dynamometers for the measurement of compression and tensile stresses have been heretofore proposed comprising a ring-shaped spring to the opposite sides of which parallel rods are connected along a diameter of the ring for the application of the compression or tensile stresses, the ring being deformed on loading of these rods. Such deformation is then communicated to an electrical device for the generation of a signal representative of the stress to be measured. A suitably connected indicator then gives a measure of the deformation. Since the circular spring can be subjected to undesired influences, for example those of temperature variations, these influences also produce deformations which can falsify the readings obtained.

The ring-shaped spring is usually shaped as a hollow cylinder with plane end faces, receiving in its interior the electrical apparatus and provided with cover plates which are tightly sealed to the ends of the cylinder. Upon deformation of the spring, forces of friction appear at the closure surfaces which likewise impair the accuracy of the results.

In the dynamometers of the invention these objectionable influences are minimized or suppressed.

It is an object of the invention to provide a dynamometer of ring type including for transfer of the mechanical deformation of the spring to the electrical measuring apparatus an element which compensates for effects of temperature change. It is a further object of the invention to provide a transfer element such that stresses transverse to the ring-shaped spring will be without influence upon the operation of the electrical components of the dynamometer.

It is a further object of the invention to provide, for a cylindrical ring-shaped dynamometer, cover plates so arranged that no frictional forces can arise at the sealing junctions between these cover plates and the spring which will hamper or otherwise influence the deformation of the spring by the stresses to be measured. According to a further feature of the invention, these cover plates are so constructed and so fastened to the spring as to cause the cover plates to act as limits upon the deformation of the spring and also upon motion of the electrical signal generating apparatus.

According to another feature of the invention, the ring-shaped spring is so constructed as to be uniformly subjected to bending at all cross-sections thereof.

In the accompanying drawings, there is shown a preferred exemplary embodiment of the invention with reference to which the invention will now be further described. In these drawings:

Fig. 1 is a sectional view in elevation of a dynamometer according to the invention taken on the line 1—1 of Fig. 2, partly further broken away; and Fig. 2 is a further sectional elevation of the dynamometer of Fig. 1 taken on the line 2—2 of Fig. 1.

The dynamometer of the drawings comprises an elastic ring-shaped element 1 having reinforcing portions or lugs 2 and 3 of increased thickness at diametrically opposite portions thereof. This structure is advantageously produced by turning or boring out a steel workpiece, substantially cylindrical on its exterior surface between its end lugs, on separate bores whose axes, indicated at 4 and 5, are displaced laterally on opposite sides of the lengthwise axis of the body, defined as that joining the lugs 2 and 3. The separation of the boring axes 4 and 5 is such that the thickness of the cylindrical wall increases from a minimum value in a plane containing the axes 4 and 5 to a maximum thickness adjacent the portions 2 and 3. In this way the periphery of the spring is provided with a cross-section of substantially uniform resistance to deformation so that the portions of the ring which are susceptible of deformation are firmly connected with the end lugs 2 and 3.

The lugs 2 and 3 are provided with bores 6 and 7 which respectively accommodate threaded studs 8 and 9. It is to these studs, and hence to lugs 2 and 3, that the stresses to be measured, whether compression or tensile, are applied. The studs 8 and 9 may be shaped according to the couplings employed for the application thereto of the stresses to be measured. With the application of a stress between the studs 8 and 9, the studs either approach or recede from each other. The variation in their separation is (within the elastic limit of the spring) proportional to the stress applied. A short stud 10 threaded into the bore 7 has affixed thereto a plate 11 bent at the far end at 12, as indicated in Fig. 1. Two insulators 13 are fastened to the inclined portion 12 of this plate and each of these carries a winding 14 of resistance wire.

Side portions 15 of the support plate 11 provide bearings for a lever 16 rotatable about an axis 17, transverse to the line joining lugs 2 and 3 and to the length of windings 14. The lever is provided with a bearing recess 19, as indicated in Fig. 1, laterally displaced from the axis of rotation 17. The recess 19 receives the end of a rod 20, preferably rounded to spherical shape. The opposite end of the rod 20 is received in a similar recess 22 of an abutment 21 threaded into the bore 6. A screw driver slot 23 in the abutment 21 permits adjustment of the position of the abutment 21 and consequent adjustment of the angular position of lever 16 (for an unstressed condition of the dynamometer), the lever being retained against the rod 20 by a spring 18 engaged between the lever and the support 11.

Two arms 25 are fastened to lever 16 via insulating wafers 24 in order to insulate these arms from the lever. Each arm carries at its far end a sliding contact illustrated in the drawings as a V-shaped wire 26, these sliders moving over the windings 14 with rotation of lever 16. The two windings are connected in parallel between a pair of terminals 27' and 27'', but with a reversal of their leads, so that each of the terminals 27' and 27'' connects with the end of one winding adjacent plate 11 and with the end of the other winding adjacent the free end of its support 13. Preferably, the arrangement is such that, e. g., by equal positioning of windings 14 with respect to plate 11 and with suitable adjustment of screw 21, the sliders 26 contact the windings at their midpoints when the dynamometer is unstressed. Consequently no difference in potential appears between the two sliders until a stress is applied. When a stress is applied, the voltage appearing is proportional in polarity and magnitude to the sign and magnitude of the applied stress.

The voltage picked off at the slider 26 is applied via flexible leads 27a to two terminals 27, from which it can be conducted to an indicating instrument such as a voltmeter.

If the ring-shaped spring 1 is deformed, the separation of the bearings or abutments 10 and 21 will be altered with a consequent rotation of lever 16, since the separation of the bearing recesses 19 and 22 is maintained unchanged by rod 20, the stress on which remains substantially unchanged. Consequently, the contacts 26 are shifted across the resistance windings 14 through a distance proportional to the strain imposed on the dynamometer. The measurement voltage picked off between contacts 26 is consequently proportional to the strain imposed on the spring and hence to the stress applied thereto. The scale of an indicator such as a voltmeter connected to the terminals 27 can be calibrated directly in pounds. Of course, however, the measurement voltage can also be employed in other ways, for example by application to control circuits, bridges, relays, and the like.

By means of the adjustment stud 21 the position of the sliders 26 on windings 14 can be so adjusted that the voltage difference between the two sliders will be zero for the unstressed condition of the dynamometer.

This zero potential difference for an unstressed condition of the dynamometer, i. e. for zero stress between studs 8 and 9, will in the dynamometer of the invention remain at zero in spite of changes in temperature to which the spring 1 is subjected. The material of the rod 20 is so selected with respect to its temperature coefficient of expansion as to compensate exactly for variations with temperature in the separation of the bearings elements 19 and 21 in order to maintain unchanged the angular position of lever 16 with respect to support 11.

Transverse stresses, such as those appearing as components of stresses to be measured obliquely applied between the studs 8 and 9, are without effect on the measured result since the length of the rod 20 and its support are so selected that with a displacement of one end of the rod, for example, transverse to its own length as indicated in Fig. 2 by the arrow 29, the length, i. e., the effective turning radius of the rod is the same as the transverse bending radius of the spring, so that again the position of lever 16 will remain unchanged.

In order to protect the delicate measuring train in the interior of the spring from atmospheric effects, cover plates 34 and 35 are provided, fastened by means of bolts 30 and 31 which pass through bores 32 and 33 in lugs 2 and 3.

Whereas the bolts 30 possess a press fit in their bores 32 in lug 3, the bolts 31 are so reduced in diameter with respect to the bores 33 in lug 2 as to provide a clearance between bolts 31 and bores 33, the bolts 31 being concentrically located in bores 33 for an unstressed condition of the dynamometer. The clearance is so selected, for example of a few tenths of a millimeter, that the lug 2 can shift with respect to the bolts 31 by the amount corresponding to the maximum stress which the dynamometer is intended to measure before bolts 31 will bring up against the wall of bores 33. The bolts 30, like the bolts 31, have a nice fit in the cover plates 34 and 35 so that the separation of the two sets of bolts is unaffected by stress applied to the dynamometer. The cover plates are easily removable from the bolts.

Spacing rings 36 which may, for example, be in the form of clamping rings or washers, are so provided at the ends of bolts 30 and 31 that a desired air space L is provided between the plane, cylindrical end faces of the ring-shaped spring 1 and the cover plates 34 and 35. This air space is sealed off at each end of the ring by means of a hollow grommet 37 which is accommodated in a groove 38 of semi-circular section in each cover plate. The exterior diameter of the grommet 37 is less than that of the semi-circular groove 38 but greater than the separation of the end faces of the spring from the bottoms of these grooves. Consequently the grommets maintain the cover plates stressed against the spacers 36 so that the air space L is of about the same size on both sides of the spring. Upon compression or stretching of the spring the grommets roll in their grooves and in this way even a residual frictional force between the spring and the cover plates is prevented. In place of such a force of friction the closure structure just described simply adds to the elastic properties of the spring the elasticity of the grommets.

Terminals 27, 27' and 27" are passed through the terminal plate 35 via an air-tight insulating fitting 40. The cover plates hermetically seal the electrical measurement signal generating apparatus against the outside atmosphere and this apparatus is so constructed as to leave the measured results independent both of temperature variations and of stresses which are oblique to the direction of the applied stress which is parallel to the arrow 28.

While the invention has been described herein in terms of a preferred embodiment, various modifications may be made therein without departing from the scope of the invention itself which is set forth in the appended claims.

I claim:

1. A dynamometer for the measurement of compression and tensile stresses comprising an elastic ring, separate means on opposite sides of said ring between which stresses to be measured may be applied, a variable electrical element supported within said ring, means movably supported within said ring from one of said sides for engagement with said element to vary the value thereof, and movement transmitting means linking said movable means with the other of said sides, said movement transmitting means having a length substantially equal to the bending radius of said ring with respect to bending stresses applied to said ring transversely of the diameter joining said sides.

2. A dynamometer for the measurement of compression and tensile stresses comprising an elastic ring, separate means on opposite sides of said ring between which stresses to be measured may be applied, a resistance winding supported within said ring, a lever pivotally supported from a portion of said ring, an electrical contact arranged on said lever to engage successive portions of said winding with rotation of said lever, and a bar engaged between said lever and a portion of said ring remote from the support for said lever, said bar having a coefficient of thermal expansion adapted, by reference to the coefficient of thermal expansion of said ring, to the difference between the length of said bar and the separation of said support and portion to maintain the angular position of said lever about its pivotal support unchanged with changes in ambient temperature.

3. A dynamometer for the measurement of compression and tensile stresses comprising a substantially cylindrical elastic ring having plane end faces, lugs on opposite sides of said ring between which stresses to be measured may be applied, a resistance winding supported within said ring, a lever pivoted within said ring adjacent one of said lugs for rotation about an axis transverse to the line joining said lugs, an electrical contact arranged on said lever to engage successive portions of said winding upon rotation of said lever, means linking said lever with the one of said lugs opposite that adjacent which said lever is supported, cover plates for said ring, said plates having formed therein grooves conforming to the end faces of said ring, means fastening each of said plates to one of said lugs with a clearance between the plate and adjacent end face of said ring, and a sealing ring in each of said grooves adapted to seal said clearance, said fastening means permitting motion of each of said plates with respect to one of said lugs parallel to said end faces.

4. A dynamometer for the measurement of compression and tensile stresses comprising an elastic ring, lugs on opposite sides of said ring between which stresses to be measured can be applied, two resistance windings disposed substantially parallel to each other within the ring, a lever pivotally mounted from one of said lugs for rotation about an axis transverse to the length of said windings, separate contacts arranged on one end of said lever for engagement each with one of said windings, and means coupling said lever to the other of said lugs, said windings being connected in parallel between common terminals with adjacent ends of said windings connected to opposite of said terminals, whereby upon application of a potential difference across said terminals departures of said lever from a median position at which said contacts are at equipotential develop between said contacts a voltage of polarity according to the sign of the angular departure of said lever from said median position.

5. A dynamometer for the measurement of compression and tensile stresses comprising an elastic ring, separate means on opposite sides of said ring between which stresses to be measured may be applied, a resistance winding supported within said ring, a lever pivotally supported from a portion of said ring, an electrical contact arranged on said lever to engage successive portions of said winding with rotation of said lever, and a bar engaged between said lever and a portion of said ring remote from the support for said lever, said bar having a coefficient of thermal expansion differing from that of said ring by an amount proportioned to the difference between the diameter of said ring and the length of said bar, whereby the end of said bar engaged with said lever is maintained at constant spacing from the support for said lever in spite of changes in the ambient temperature.

References Cited in the file of this patent

UNITED STATES PATENTS

| | | |
|---|---|---|
| 1,724,993 | Coker | Aug. 20, 1929 |
| 2,719,430 | Dillon | Oct. 4, 1955 |

FOREIGN PATENTS

| | | |
|---|---|---|
| 887,695 | France | Aug. 16, 1943 |
| 1,022,958 | France | Dec. 24, 1952 |